2,951,633
Patented Sept. 6, 1960

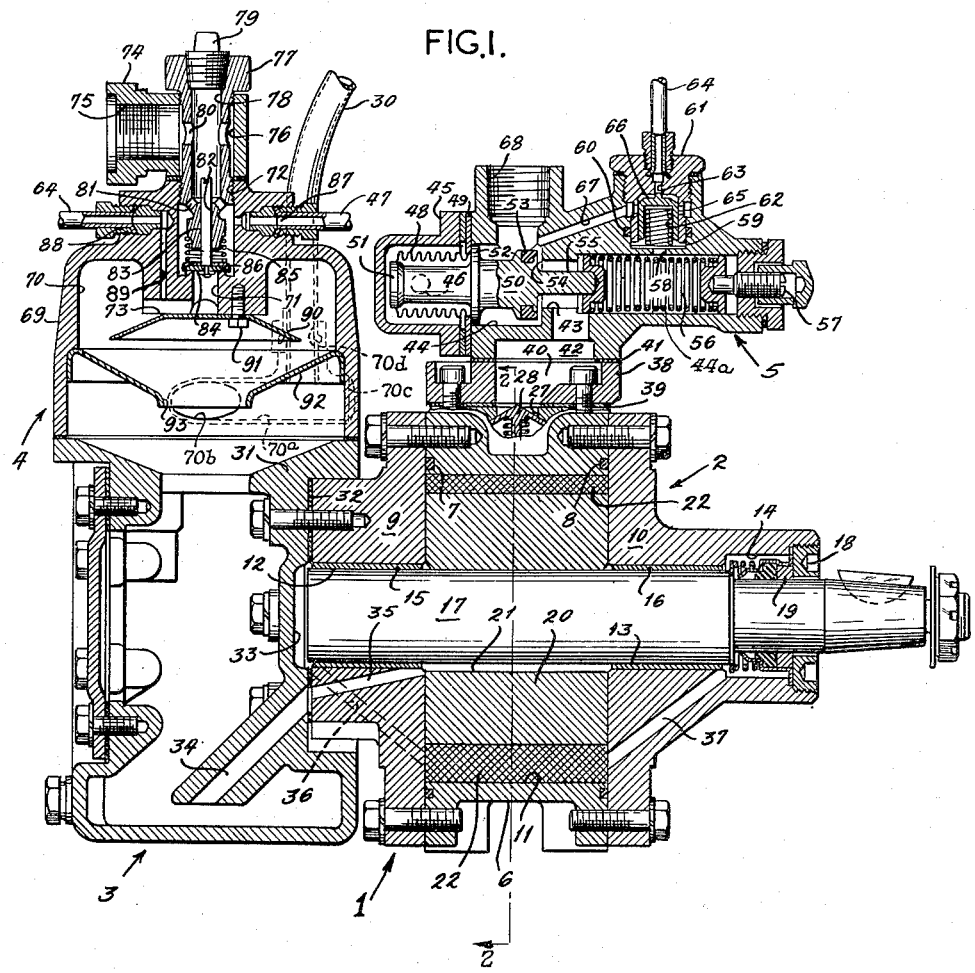

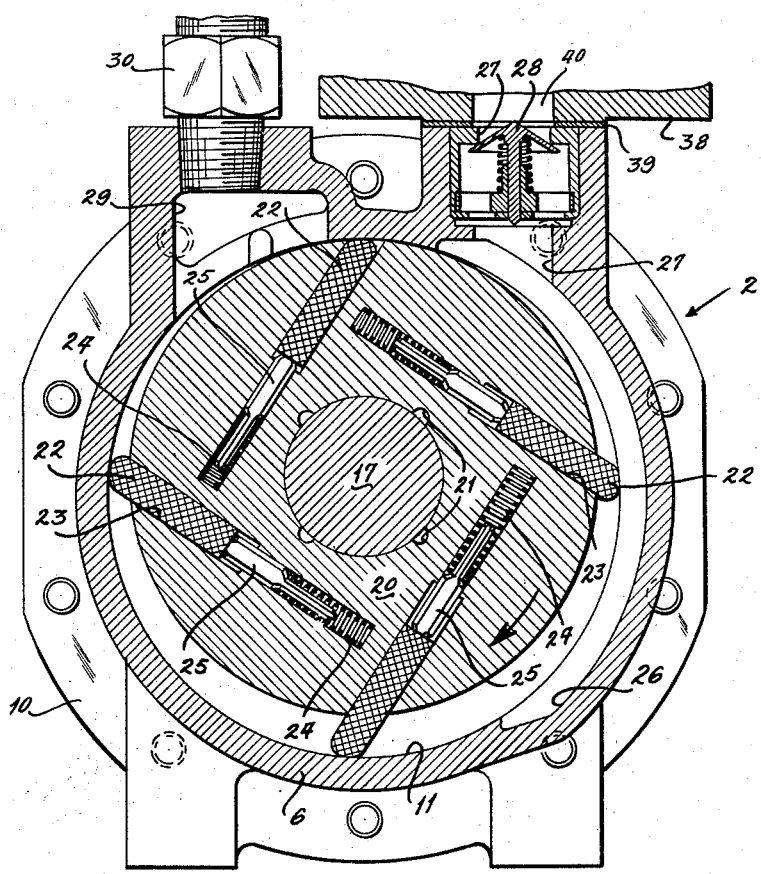

United States Patent Office

2,951,633

SYSTEM AND METHOD OF LUBRICATING AIR COMPRESSORS AND THE LIKE

Cyril B. Fites, St. Johns, Mo., assignor to Wagner Electric Corporation, St. Louis County, Mo., a corporation of Delaware Filed July 14, 1955, Ser. No. 522,020

2 Claims. (Cl. 230—207)

This invention relates to rotary air compressors and in particular to means employed for facilitating the forced lubrication thereof and for eliminating axial thrust force counteracting means.

Present compressors utilize the compressed air pressures developed therein for the forced circulation of oil in excess of that necessary for lubrication purposes. The oil is forced through passageways in the drive shaft of said compressor to lubricate the bearings journaling said drive shaft and to maintain an oil seal between a vane carrying rotor and co-operating compressor end plates. However, this arrangement and method does not fully lubricate one of the bearings journaling the drive shaft.

The pressure developed in these present compressors during the "on" cycle, or when said compressor is compressing air, acts on the inner end of the drive shaft thereby creating an axial thrust force since the other end of said shaft extends externally of said compressor and is exposed to the ambient atmospheric pressure at all times. A partial vacuum is developed in the compressor during the "off" cycle, or when said compressor is idling and not compressing air, and acts upon the inner end of the drive shaft so that the atmospheric pressure acting on the exposed end of said shaft creates another and opposite axial thrust force.

The hereinbefore described conditions present several operational difficulties including reduced wear life of the bearings due to poor oil circulation therethrough. Secondly, the repetitious occurrence of the axial thrust forces greatly impairs the normal wear life of the thrust bearing and the spring loaded thrust pin which are utilized to minimize and counteract the magnitude of said axial thrust forces. A third operational difficulty prevails since the rotor is necessarily keyed to the drive shaft and is axially movable thereon for repositioning purposes to maintain predetermined tolerances with regard to the compressor end plates when these aforementioned forces occurred. This axial movement of the rotor causes excessive wear between the end plates and said rotor and results in decreased compressor efficiency. Another operational difficulty is the intense pressure on the driven shaft seal which critically reduces the sealing life thereof and eventually causes leakage thereby. Various methods of oil circulation have been employed along with various devices to overcome or alleviate the axial thrust forces, but none have succeeded in overcoming the hereinbefore mentioned operational difficulties.

One of the principal objects of the present invention is to eliminate these undesirable conditions and to present a satisfactory system of oil circulation for lubrication purposes, and at the same time eliminate the axial thrust forces on the drive shaft. Another object of the present invention is to provide an improved rotary air compressor which obviates the use of means for counteracting the thrust forces created in said compressor. Another object is to provide an improved rotary air compressor having a unique system of oil circulation.

Still another object of the present invention is to provide an improved rotary air compressor in which excessive wear between the end plates and rotor thereof is eliminated. Still another object of the present invention is to provide an improved rotary air compressor having a driven shaft seal which is not exposed to extreme pressures. These and other objects and advantages will become apparent hereinafter.

Briefly, the present invention comprises an air compressor assembly provided with a forced oil circulating system having an oil source connected with passages provided between the rotor and the drive shaft for lubrication and sealing purposes, a passage connecting the inner end of said shaft with the low pressure intake portion of said compressor assembly for axial thrust elimination purposes, and a passage connecting the counterbore housing the driven shaft seal with the low pressure intake portion of said compressor assembly for pressure alleviation purposes.

The invention also consists in the parts and in the arrangements and combinations of parts hereinafter described and claimed. In the accompanying drawings which form part of this specification and wherein like numerals refer to like parts wherever they occur:

Fig. 1 is a cross-sectional view of a compressor assembly showing a preferred embodiment of the present invention in detail, and Fig. 2 is a cross-sectional view of the compressor taken along the line 2—2 of Fig. 1.

Referring now to Fig. 1, a compressor assembly 1 comprises a compressing unit 2, an oil sump 3, an air-oil separating unit 4, and a control valve 5. The compressing unit 2 is provided with a peripheral portion or stator member 6 carrying annular seals 7 and 8 for engagement with co-operating supports or end plates 9 and 10 respectively, said end plates being fixedly attached to said stator by suitable means. The stator 6 is provided with a bore 11 which is eccentrically positioned with regard to a bore 12 and an axially aligned bore 13 and counterbore or chamber 14 provided in the end plates 9 and 10 respectively. Bearings 15 and 16 are fixedly received in the bores 12 and 13 respectively and journal a rotatable drive shaft 17. The rightward end of the shaft 17 is coaxially arranged with a ring seat 18 threadedly received in the counterbore 14 of the end plate 10 and extends therethrough externally of said end plate for co-operable engagement with drive means (not shown). A seal assembly 19 carried by the shaft 17 is housed in the counterbore 14 and is engageable with the co-operating ring seat 18 thereby preventing the expulsion of oil from said counterbore 14. The seal assembly 19, which includes a carbon seal, a back up member, a retaining member and resilient means, rotates with the shaft 17.

A rotor 20 is fixedly arranged on the mid-portion of the shaft 17 with a plurality of oil passages 21 therebetween. Referring to Fig. 2, the rotor 20 is eccentrically positioned in the bore 11 of the stator 6 and carries a plurality of vanes 22 which are slidably retained in slots 23 provided in said rotor. A plurality of springs 24 are positioned in the slots 23 and carry push pins 25 which bias the vanes 22 into constant sealing engagement with the bore 11 of the stator 6. An air intake groove 26 is provided in the rightward portion of the bore 11 and connects with one end of a vertically arranged intake passage 27 which has an intake check valve 28 positioned in its upper end, said check valve permitting only uni-directional air flow in the upper end of passage 27. Spaced laterally leftwardly of the intake passage 27 is a discharge passage 29 which receives a discharge line 30 thereby connecting the bore 11 with the air-oil separating unit 4, to be discussed later.

The oil sump 3 is provided with a housing 31 which is fixedly attached to the end plate 9 by suitable means with a seal 32 interposed therebetween, said housing being provided with a recess or chamber 33 which is axially aligned with the bore 12 of said end plate. A duct or passage 34 is angularly positioned in the housing 31 and connects the sump 3 with one end of a passage 35 which in turn is angularly disposed in the end plate 9 and has its other end intersecting the rightward end of bore 12 in communication with the rotor 20 and passages 21. Another angularly disposed passage 36 is provided in the end plate 9 and has one end intersecting the leftward end of the bore 12 and in communication with the recess 33. The other end of the passage 36 intersects the inner face of said end plate and is in communication with the air intake groove 26 in the stator 6 shown in Fig. 2. The end plate 10, Fig. 1, is also provided with an angularly disposed passage 37, one end of which intersects the inner face of said end plate and is in communication with the air intake groove 26 in the stator 6 while the other end thereof communicates with the counterbore 14 in said end plate.

An adaptor plate 38 is attached to the upper end of the stator 6 by suitable means with a seal 39 interposed therebetween, said plate 38 being provided with a chamber 40 therein which is aligned with the upper end of the intake passage 27 in said stator. The control valve 5 is in turn attached by suitable means (not shown) to the upper side of the adaptor plate 38 with the seal 41 interposed therebetween. The control valve 5 is provided with an air chamber 42, one end of which is aligned with the air chamber 40 while the other end thereof is in communication with a horizontal cross-bore 43 which is positioned between axially aligned counterbores 44 and 44a. A bellows housing 45 is attached to the left side of the control valve 5 by suitable means, such as studs (not shown), and is provided with an inlet port 46 to receive an air line 47 for connecting said housing with the air-oil separating unit 4. A coaxially arranged bellows 48 and piston stop plate 49 are interposed between said housing 45 and said control valve 5. An air control piston 50 is provided with a leftward projection 51 which extends through the stop plate 49 into abutting engagement with the bellows 48, said projection having an annular stop 52 formed thereon to engage the right side of said stop plate. The piston 50 carries a seal 53 which co-operates with a seat 54 formed at the juncture of the cross-bore 43 and the counterbore 44, said piston 50 serving to prevent passage of atmospheric air into inlet passageway 27 of the stator 11 when said seal engages said seat. A rightward projection 55 of the piston 50 protrudes into the cross-bore 43 and counterbore 44a and abuts one end of a resilient means 56 thereby normally biasing the cup 53 away from the co-operating seat 54. The other end of the resilient means 56 abuts against an adjusting means 57 which is received through the right end of the counterbore 44a and affords a method for varying the pressure necessary to shut off the air being supplied to the compressing unit 2.

A vertical passage 58 is provided midway in the slightly larger counterbore 44a shown rightwardly of the cross-bore 43 and intersects the lower end wall of a bore 59 which fixedly receives an unloader which carries a seal 60 positioned between said bore and an unloader valve housing 61, said housing 61 being fixedly received in said bore 59. The housing 61 is provided with a bore 62 and an upper air passageway 63 which is connected to the air-oil separating unit 4 by an air line 64, said bore slidably receiving a spring biased, cup-shaped valve 65 which is normally co-operably engaged with a valve seat 66 formed by the junction of said bore 62 and said air passage 63. An air passage 67 is positioned between the bore 59 and a laterally spaced vertical bore 68, the latter having one end open at all times to the ambient atmosphere and the other end thereof intersecting the counterbore 44.

To the left of the control valve 5 is the oil-air separating unit 4 having a housing 69 which is provided with a substantially cylindrical chamber 70 therein, said housing 69 being attached by suitable means, such as studs (not shown), to the upper end of the sump 3. A horizontal passage 70a is provided in the housing 69 substantially tangential to the wall of the chamber 70. One end of the passage 70a intersects the wall of the chamber 70 forming an inlet port 70b while the other end thereof is closed by an end plug 70c; and, a cross-passage 70d which receives the discharge line 30 leading from the discharge passage 29, Fig. 2, intersects said passage 70a near the rightward end thereof, said inlet port 70b being positioned substantially tangential with the wall of chamber 70 to impart a swirling motion to the compressed air as it enters said chamber, to be discussed later. It is not necessary that the oil separating unit 4 be connected directly with the air compressor 2, as shown in Fig. 1. The separator may, if desired, be remotely positioned with respect to said air compressor.

The air-oil separating housing 69 has a bore 71 and an axially aligned counterbore 72 which are vertically arranged and extend through the upper portion of said housing with a horizontal cross-bore 73 intersecting the lower end of said bore 71. In combination, the bore 71, the counterbore 72, and the cross-bore 73 provide an outlet passage through which compressed air may be expelled from the air-oil separating unit 4.

A discharge fitting 74 having a horizontal bore 75 that is threaded at its left end is provided to receive an air reservoir discharge line (not shown). A cross-bore 76 intersects the rightward end of the bore 75 and passes through the discharge fitting 74 and slidably receives the check valve guide 77. The check valve guide 77 is threaded into the upper end of the counterbore 72 and has a vertical bore 78 which is blocked at its upper end by a plug 79. Midway of the bore 78, a cross-bore 80 passes through the check valve guide 77 thereby allowing communication between said bore 78 and the bore 75 of the fitting 74.

The lower end of the bore 78 in the check valve guide 77 is intersected by a plurality of angularly disposed passages 81 and a valve stem receiving bore 82 which is axially aligned with said bore 78. The angularly disposed passages 81 connect the bore 78 of the check valve guide 77 with the counterbore 72 provided in the housing 69. A valve stem 83 of an outlet check valve 84 is slidably received in the bore 82, and a spring 85 is interposed between the lower end of the check valve guide 77 and said check valve 84 which is normally biased thereby into sealable engagement with a co-operating seat 86 formed by the juncture of the bore 71 and the counterbore 72.

Extending rightwardly from the counterbore 72 in the housing 69 is a passage 87 which receives the air line 47 connecting the counterbore 72 with the inlet 46 of the bellows housing 45, the purpose of which will be hereinafter described. Another passage 88 enters the housing 69 leftward of the counterbore 72 but does not extend therethrough. The inner end of the passage 88 is intersected by one end of a downwardly extending passage 89, the other end thereof intersecting the cross-bore 73. The passage 88 receives one end of the air line 64 which has its other end connected to the unloader valve housing 61 in the control valve 5, as previously described.

A dished baffle 90 is attached to the housing 69 at the lower end of the bore 71 by suitable means, such as a screw 91. Another baffle 92 having a centrally located aperture 93 is fixedly arranged with the wall of the chamber 70. The baffles 90 and 92 serve to present a tortuous discharge path to the oil laden compressed air which is introduced into the air-oil separating unit 4.

Operation

In the operation of the compressor assembly 1, it is important to consider the operation of the control valve 5 and its effect on the compressing unit 2 with regard to the air-oil separating unit 4, and also, the manner in which oil is circulated through said assembly 1 in excess of lubrication requirements.

Two conditions will occur which are regulated by the control valve 5: first during the "on" cycle when the compressing unit 2 is supplying a compressed air and oil mixture to the air-oil separating unit 4; and secondly, during the "off" cycle when the supply of air to the compressing unit 2 is interrupted thereby stopping the supply of compressed air and oil mixture to said unit 4. The maximum and minimum pressures at which the above mentioned conditions occur are predetermined and are governed by the adjustable compressive force of the resilient means 56. The compressive force of the resilient means normally acts on the piston 50 biasing said piston leftward and disengaging the seal 53 from the co-operating seat 54. Another force, created by the pressure in the air reservoir (not shown), and transmitted by the air line 47 to act on the effective area of the bellows 48 in the control valve 5, is also effective on the piston 50 thereby opposing the first mentioned compressive force of the resilient means 56. It is, therefore, apparent that the operation of the compressing unit 2 shifts between the aforementioned two conditions in response to the above mentioned differential of forces governing the regulation of the compressor cycling.

Due to the repeated occurrence of the above mentioned two conditions, oil is continuously forced through the compressor assembly 1. When the compressing unit 2 is compressing air in the "on" cycle, the air pressure created in the air-oil separating unit 4 and the oil sump 3 is greater than a very slight suction pressure, or partial vacuum in the air intake groove 26 which is created by the sealing vanes 22 revolving in the stator 6; thereby, a pressure differential is established therebetween. When the compressing unit 2 is idling in the "off" cycle, it is so constructed as to operate at a partial vacuum while the air-oil separating unit 4 and the oil sump 3 are vented to the ambient atmosphere. Therefore, a pressure differential is established therebetween. In this manner, the above mentioned pressure differentials govern the forced circulation of oil from the sump 3 into the compressing unit 2.

When the compressor assembly 1 commences the compression of air in the "on" cycle, the pressure differential established thereby, as previously described, forces the oil in the oil sump 3 through the passage 34 therein and the connected passage 35 in the end plate 9. Therefrom, a portion of the oil flows between the shaft 17 and the bearing 15, into the cavity 33, through the passage 36 into the air intake groove 26, Fig. 2, of the stator 6 where said oil becomes mixed with air entering said stator, to be discussed later. The other portion of the oil flows from the passage 35, Fig. 1, in the end plate 9, through the passages 21 between the shaft 17 and the rotor 20, between said shaft and the bearing 16 in the end plate 10, into the counterbore 14, and therefrom through the passage 37 into the air intake groove 26 of the stator 6 where said oil becomes mixed with the air entering said stator, to be discussed later. From the foregoing it is apparent that the bearings 15 and 16 are satisfactorily lubricated and that both the recess 33 and the counterbore 14 are vented to the air intake groove 26 of the stator 6. Thus, the chambers 33 and 14 are under the same very light suction pressure at all times during the "on" cycle. Since these chambers and the right end of the shaft 17 are all subjected to a substantially equal pressure, there is no thrust on either end plate 9 and 10.

In the "on" cycle, the compressive force of the resilient means 56 in the control valve 5 acting on the piston 50 overcomes the opposing force on said piston 50 created by the pressure in the reservoir tank (not shown) which is effective on the bellows 48 in said control valve 5 through the air line 47. In this manner, the seal 53 carried by piston 50 is disengaged from the co-operating seat 54. Since a partial vacuum is developed in the intake portion of the stator 11 as the sealing vanes 23 are revolved therein, the ambient air is sucked into the bore 68 of the control valve 5, past the valve seat 54 and into the cross-bore 43 and the chamber 42. The air flows therefrom through the chamber 40 of the adaptor plate 38, past the unidirectional intake valve 28 in the stator 6, Fig. 2, into the intake passage 27 and the intake groove 26. As aforementioned, the oil flowing into the intake air groove 26 from the passages 36 and 37 respectively, Fig. 1, is at this time mixed with the incoming air. Some of the oil in this air-oil mixture adheres to the respective parts in the stator 11 forming an oil seal therein which confines said mixture during compression. This entering air and oil mixture is confined between two successive vanes 22 of the rotor 20 and the walls formed between said rotor and the stator 6 as said vanes pass the lower end of the air intake groove 26.

As the rotor 20 turns clockwise, indicated by the arrow in Fig. 2, the air-oil mixture confined between the successive blades 22 is compressed into progressive smaller volumes. When the rotor 20 has turned to a position where the successive blades 22 are opposite the discharge passage 29, the compressed air and oil mixture moves into said discharge passage, the discharge line 30, and through the cross passage 70d, the passage 70a, and the inlet port 70b, Fig. 1, into the chamber 70 of the air-oil separating unit 4. Successive quantities of the compressed air and oil mixture are delivered in this way in rapid order to the air-oil separating unit 4.

As previously described, the mixture of oil and compressed air is introduced into the air-oil separating unit 4 with a swirling motion which causes the heavier oil particles in said mixture to be thrown against the wall of the chamber 70 where the particles cling and drain into the oil sump 3. While these heavier oil particles are separated, a mist of oil remains with the compressed air to be further separated as said compressed air passes over the baffles 90 and 92. In this manner, the oil is separated from the compressed air and oil mixture and the separated oil drains into the oil sump 3. The oil free compressed air passes through the cross-bore 73 in the upper end of the housing 69 into the bore 71, past the outlet check valve 84 and into the counterbore 72, through the passages 81, the bore 78 and the cross-bore 80 of the valve guide 77, into the bore 75 of the fitting 74, and therefrom to the reservoir tank (not shown).

As the pressure in the reservoir tank increases, it will reach the aforementioned predetermined maximum value. The pressure present in the reservoir tank is also supplied through the air line 47 to the bellows housing 45. A pressure increase in the bellows housing 45 acts on the effective area of the bellows 48 moving said bellows rightwardly which in turn urges the piston 50 rightward against the opposing compressive force of the resilient means 56. When the piston 50 has moved to its rightward limit, the sealing cup 53 thereon engages the co-operating seat 54 shutting off the ambient air supply to the intake portion of the stator 6 causing the compressor assembly 1 to go into the "off" cycle. In this manner, a partial vacuum is created in the stator 6 extending upwardly into the bore 43 and counterbore 44a which houses the resilient means 56, and to the unloader valve 65. The unloader valve 65 is thereby unseated and is drawn down by this partial vacuum serving to vent the air-oil separating unit 4 and the oil sump 3 to atmosphere via the passages 88 and 89 in said unit 4, the air line 64, the passage 63 in the unloader valve housing 61, and the passage 67 and bore 68 in the control valve 5. Since the oil sump 3 and the air-oil separating unit 4 are vented to atmosphere and the maximum predetermined pressure prevails in the reservoir tank (not shown), a pressure differential is created therebetween which seats the outlet check valve 84 maintaining said maximum pressure in the reservoir tank. The partial vacuum which operated the unloader valve 65 also acts on the sealing cup 53 carried by the piston 50 urging said cup into further sealing engagement with the co-operating seat 54.

During the "off" cycle, ambient air pressure prevails in the oil sump 3 and the air-oil separating unit 4 and a partial vacuum exists in the stator 6, as hereinbefore described. Therefore, due to this pressure differential, oil is still forced from said sump 3 through the compressor assembly 1, as was described during the "on" cycle. This "off" cycle condition continues until the pressure in the reservoir tank (not shown) is diminished to the predetermined low limit. When this occurs there will be a similar reduction in pressure inside the bellows housing 45, and the compressive force of the resilient means 56 overcomes the combined force of the reduced pressure acting on the effective area of the bellows 48 and the force of the partial vacuum in the control valve 5 assisting the seating of the sealing cup 53. With the piston 50 moved to its leftward limit, the ambient air is again supplied to the intake portion of the stator 6, and the compressor assembly 1 again resumes the compression of air in the "on" cycle.

The unseating of the sealing cup 53 destroys the partial vacuum on the unloader valve 65 which is then reseated by its co-operating spring thereby blocking the passage to atmosphere from the air-oil separating unit 4 and the oil sump 3.

During the "on" cycle of the compressor assembly 1, the pressure acting on the left and right ends of the shaft 17 is the ambient air pressure since the recess 33 is vented to the air intake groove 26 of the stator 6 and the right end of said shaft extends externally of the end plate 10. Therefore, it is apparent that axial thrust forces are eliminated from the compressor assembly 1 during the "on" cycle. During the "off" cycle, a slight partial vacuum prevails in the recess 33 acting on the left end of the shaft 17 while the right end thereof is exposed to atmospheric pressure. This differential causes a minute axial thrust force to the left. However, this thrust force is negligible and is absorbed by the end plate 9 and the rotor 20 which is fixedly attached to said shaft 17, as aforementioned. Consequently, it is obvious that the use of means, such as thrust bearings or thrust pins, are obviated in the instant compressor assembly 1.

It is obvious from the description that the unique forced oiling system in the compressing unit 2 enhances the flow of an equal amount of oil to all the lubricated parts integral to said unit 2 since the flow of oil through both bearings 15 and 16 is vented to the air intake groove 26 in the stator 6. In this manner, no one lubricated part is restricted or partially restricted from receiving a continuous flow of oil.

Excessive wear between the end plates 9 and 10 respectively and the rotor 20 is eliminated since said rotor is fixedly arranged on the shaft 17 and since opposing axial thrust forces are substantially eliminated in the compressor assembly 1. The fixed arrangement between the rotor 20 and the shaft 17 obviates any axial movement of said rotor between end plates 9 and 10 respectively when said rotor is being revolved in the stator 6. During the "on" cycle, the axial thrust forces on the shaft 17 are eliminated, as previously described, obviating any axial movement of the rotor 20 between the end plates 9 and 10 eliminating wear therebetween. The slight leftward axial thrust force during the "off" cycle, as previously described is negligible being readily absorbed by the end plate 9 and the rotor 20 and does not cause excessive wear therebetween.

The sealing life of a driven seal which seals against intense pressures is in all cases very critical. It is readily apparent that the sealing life of the driven sealing assembly 19 has been enhanced since the counterbore 14 housing said assembly 19 is vented to the air intake groove 26 of the stator 6 in which very low pressures are maintained.

This invention is intended to cover all changes and modifications of the example of the invention herein chosen for purposes of the disclosure, which do not constitute departures from the spirit and scope of the invention.

What I claim is:

1. A compressor including an oil sump, a housing comprising a peripheral portion and end plates, an air intake chamber, a rotor rotatably mounted in said peripheral portion between said end plates and adjacent to the air intake chamber, a spaced compression chamber, said oil sump being connected with said compression chamber, an imperforate drive shaft having opposed ends rotatably mounted in said end plates on bearings, said rotor being fixed to said drive shaft between said bearings, one end of said drive shaft extending through a seal chamber formed in said compressor housing and extending outwardly of said housing and subject to atmospheric pressure, the other end of said shaft terminating in a closed chamber formed in said compressor housing, control means for said compressor to maintain a pressure differential between said oil sump and intake chamber, said pressure differential being at a lesser magnitude during the non-compressing cycle of said compressor than during the compressing cycle, a reservoir for compressed fluid, means connecting the reservoir to the control means, said control means being responsive to reservoir pressure to alternately connect the intake chamber and the oil sump to atmosphere, means for lubricating said bearings and eliminating thrust on the drive shaft, said lubricating means comprising a plurality of longitudinal passages between said rotor and said drive shaft in communication with the ends of said bearings adjacent to said rotor, a duct extending from said oil sump through one of said end plates to said passages and said bearings, passageways in said end plates connecting the seal and closed chambers adjacent to the ends of said bearings opposite to said rotor with said intake chamber, wherein oil is continuously flowed from said sump through said bearings to said air intake chamber due to said pressure differential and wherein the pressures in said seal and closed chambers and said air intake chamber are substantially equal at all times to eliminate thrust on said shaft.

2. A device of the type described comprising a compressor having compression and idle cycles, said compressor including a housing having end members defining therebetween a rotor cavity having a low pressure intake chamber and a high pressure compression chamber, an imperforate rotor carrying shaft journaled in bearing portions of said end members on each side of said cavity and having first and second ends, a first chamber formed in one end member outwardly of the bearing portion thereof and said shaft extending through said first chamber and having its first end positioned outwardly of said housing, a second chamber formed in the other end member outwardly of its bearing portion and the second end of the shaft being positioned in said second chamber, an oil sump connected to the compression chamber of said compressor, an oil conducting passage between said oil sump and said shaft intermediate the bearing portions of said end members, passages connecting said first and second chambers with said intake chamber, and control means operatively connected to said compressor and to said oil sump for maintaining a pressure differential between said intake chamber and oil sump during both compression and idle cycles, said control means connecting said oil sump to atmosphere and sealing said intake chamber from atmosphere to produce a sub-atmospheric pressure therein during the idle cycle, and connecting said intake chamber to atmosphere and sealing said oil sump from atmosphere during the compression cycle in which high compression pressures prevail in said oil sump.

References Cited in the file of this patent

UNITED STATES PATENTS

| | | |
|---|---|---|
| 1,364,246 | Carrey | Jan. 4, 1921 |
| 1,676,783 | King | July 10, 1928 |
| 1,888,860 | Kercher | Nov. 22, 1932 |
| 1,928,300 | Peltier | Sept. 26, 1933 |
| 1,971,448 | Hapgood | Aug. 28, 1934 |
| 2,275,774 | Kraissl | Mar. 10, 1942 |
| 2,306,632 | McCormack | Dec. 29, 1942 |
| 2,476,383 | Porteous | July 19, 1949 |